US 8,550,220 B2

(12) United States Patent  (10) Patent No.: US 8,550,220 B2
Iwai et al.  (45) Date of Patent: Oct. 8, 2013

(54) BICYCLE BRAKE PAD (75) Inventors: Toru Iwai, Sakai (JP); Takashi Fujitani, Sakai (JP)

(73) Assignee: Shimano Inc., Osaka (JP)

( * ) Notice: Subject to any disclaimer, the term of this patent is extended or adjusted under 35 U.S.C. 154(b) by 266 days.

(21) Appl. No.: 12/828,599

(22) Filed: Jul. 1, 2010

(65) Prior Publication Data
US 2012/0000735 A1    Jan. 5, 2012

(51) Int. Cl.
*F16D 65/12* (2006.01)

(52) U.S. Cl.
USPC ............... 188/264 A; 188/71.6; 188/73.1; 188/218 XL; 188/250 B (58) Field of Classification Search
USPC ............ 188/26, 71.6, 73.1, 218 XL, 250 B, 188/250 R, 253, 261, 264 A, 264 R
See application file for complete search history.

(56) References Cited

U.S. PATENT DOCUMENTS

| | | | | |
|---|---|---|---|---|
| 3,277,985 A | * | 10/1966 | Caskey | 188/264 AA |
| 3,592,297 A | * | 7/1971 | Leffert | 188/71.6 |
| 3,776,333 A | * | 12/1973 | Mathauser | 188/344 |
| 3,921,764 A | * | 11/1975 | Mathauser | 188/24.14 |
| 4,036,333 A | * | 7/1977 | Mathauser | 188/264 A |
| 4,333,550 A | * | 6/1982 | Shirai | 188/72.2 |
| 4,441,592 A | * | 4/1984 | Everett | 188/264 A |
| 4,553,641 A | | 11/1985 | Scott et al. | |
| 6,206,151 B1 | | 3/2001 | Nakamura | |
| 7,278,519 B2 | | 10/2007 | Iwai et al. | |
| 7,490,704 B2 | | 2/2009 | Hara et al. | |
| 7,516,824 B2 | | 4/2009 | Iwai et al. | |
| 7,905,335 B2 | * | 3/2011 | Demers | 188/264 R |
| 2005/0269167 A1 | | 12/2005 | Iwai et al. | |
| 2008/0257664 A1 | * | 10/2008 | Holme et al. | 188/250 B |
| 2009/0084642 A1 | | 4/2009 | Iwai et al. | |

FOREIGN PATENT DOCUMENTS

| | | |
|---|---|---|
| CN | 101363488 A | 2/2009 |
| DE | 2540907 A1 | 4/1976 |
| DE | 4127113 A1 * | 2/1993 |
| DE | 10030715 A1 | 1/2002 |
| DE | 102008039672 A1 | 2/2010 |
| TW | 262003 U | 11/1995 |
| TW | M365418 U | 9/2009 |
| WO | 2004/092607 A1 | 10/2004 |

* cited by examiner

*Primary Examiner* — Robert A Siconolfi
*Assistant Examiner* — Mariano Sy
(74) *Attorney, Agent, or Firm* — Global IP Counselors (57) ABSTRACT

A bicycle brake pad includes a cooling plate and a friction plate. The cooling plate has a first surface and a second surface. The cooling plate includes a pad supporting section and a heat dissipation section. The friction pad is mechanically and fixedly connected to the pad supporting section of the cooling plate.

18 Claims, 7 Drawing Sheets

BICYCLE BRAKE PAD

BACKGROUND

1. Field of the Invention

This invention generally relates to a bicycle brake pad. More specifically, the present invention relates to a bicycle brake pad having cooling surfaces.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a bicycle brake pad with cooling surfaces for heat dissipation that extend away from a friction surface of the bicycle brake pad.

In view of the state of the known technology, a bicycle brake pad in accordance with the present invention includes a cooling plate and a friction pad. The cooling plate has a first surface and a second surface. The cooling plate includes a pad supporting section and a heat dissipation section. The friction pad is mechanically and fixedly connected to the pad supporting section of the cooling plate.

BRIEF DESCRIPTION OF THE DRAWINGS

Referring now to the attached drawings which four a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
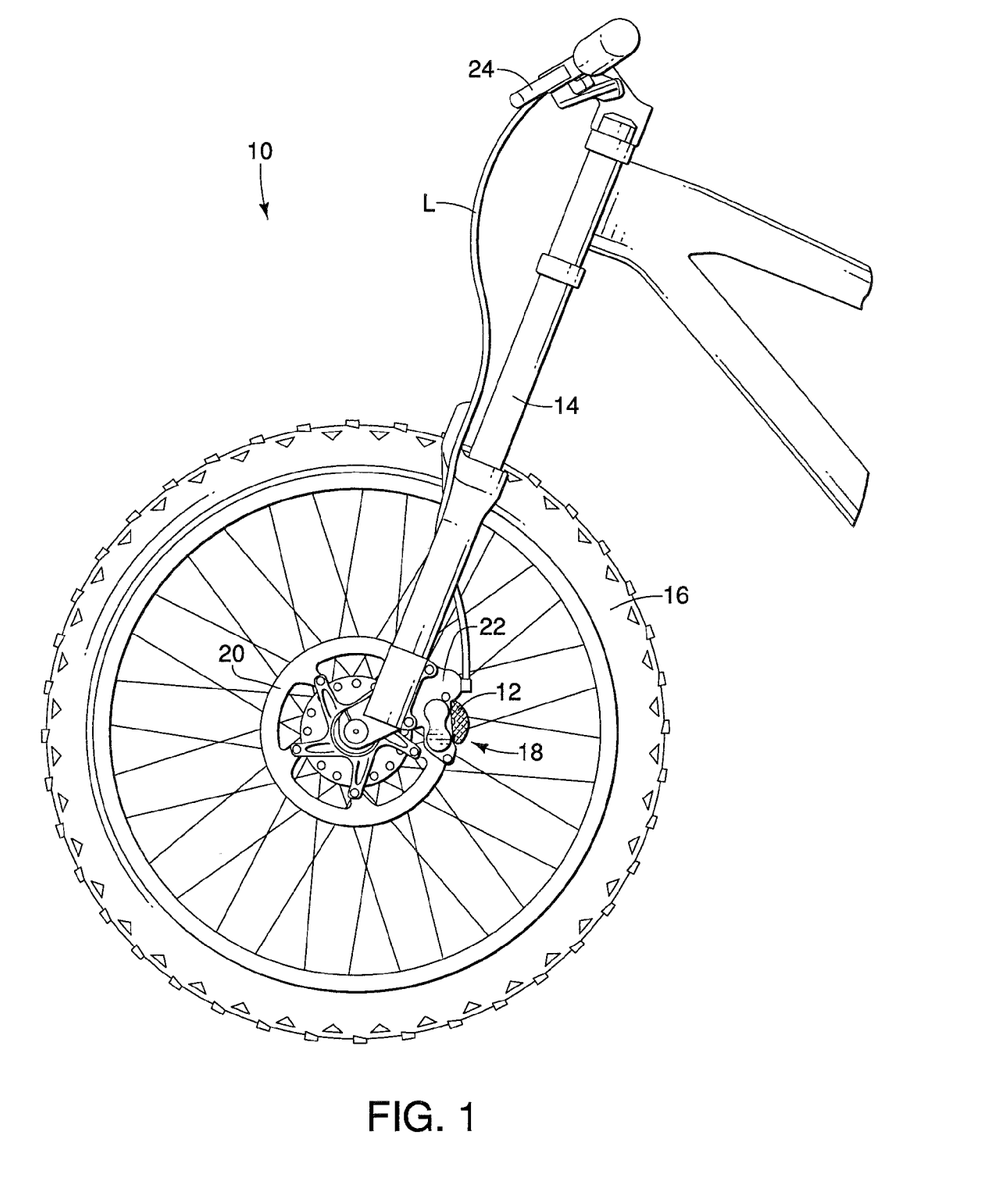
FIG. 1 is a side elevational view of a bicycle that is equipped with a brake pad in accordance with one embodiment.

Referring initially to FIG. 1, a bicycle 10 is illustrated with brake pads 12 in accordance with a first embodiment.

The bicycle 10 basically includes, among other things, a frame 14, a front wheel 16, a front brake assembly 18 and the brake pads 12. The front brake assembly 18 includes a brake rotor 20, a brake caliper 22, a brake actuation mechanism 24 and a pair of the brake pads 12.

The brake rotor 20 is a conventional brake rotor that is fixedly attached to a hub portion of the front wheel 16 for rotation therewith. The brake rotor 20 can be bolted to the hub portion of the front wheel 16 or fitted to a hub flange and held in position by a hub nut (not shown) to the hub portion of the front wheel 16 in a conventional manner.

Figure 3:
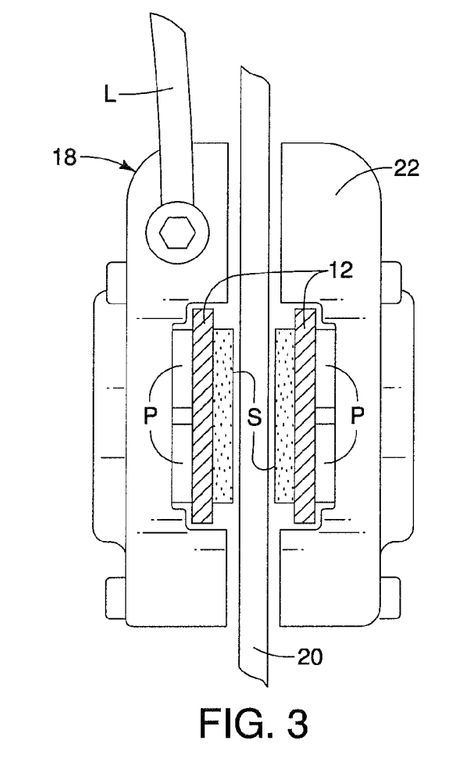
FIG. 3 is a schematic end view of the brake caliper showing hydraulic pistons of the caliper along with two of the brake pads, one pad on either side of the rotor, with the pads spaced apart from the rotor such that the rotor and a front wheel of the bicycle can rotate in accordance with the one embodiment.

The brake caliper 22 and the brake actuation mechanism 24 are conventional braking components. As best shown in FIG. 3, the brake caliper 22 and the brake actuation mechanism 24 are preferably hydraulic devices. Specifically, in response to the brake actuation mechanism 24 being operated by a cyclist (not shown), hydraulic pressure is transmitted through a hydraulic line L that connects the brake actuation mechanism 24 to the brake caliper 22 in a conventional manner. The transmitted hydraulic pressure causes a piston or pistons P of the brake caliper 22 to move the brake pads 12 into contact with opposite surfaces of the brake rotor 20, as indicated in FIGS. 3 and 4.

Figure 4:
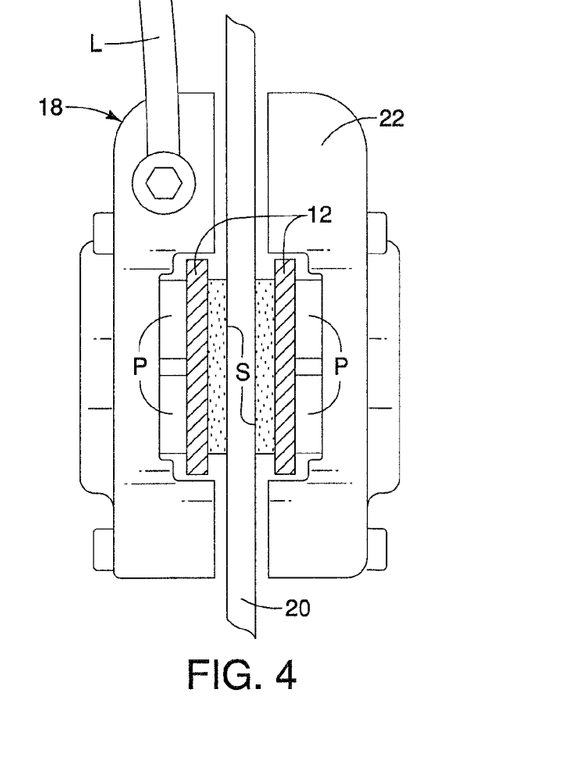
FIG. 4 is a schematic end view of the brake caliper similar to FIG. 3, showing the hydraulic pistons of the caliper urging the two brake pads into contact with the rotor such that a braking force is applied by friction surfaces of the brake pads to corresponding surfaces of the rotor to slow and subsequently stop rotation of the front wheel in accordance with the one embodiment.

It should be understood from the drawings and the description herein that the brake caliper 22 can include a single piston or can have a pair of pistons P, as depicted in FIGS. 3 and 4.

When the brake pads 12 are urged into contact with the surfaces of the brake rotor 20, braking force is generated to stop the front wheel 16 from rotating. As a result, heat is generated. As is described in greater detail below, the brake pads 12 are designed to dissipate generated heat.

The pair of brake pads 12 are preferably identical or mirror images of one another. Description of one brake pad 12 applies equally to both. Therefore, for the sake of brevity, only one of the brake pads 12 is described hereinbelow.

As best shown in FIGS. 5-12, the brake pad 12 includes a cooling plate 30, an attachment plate 32 and a friction pad 34 that are all rigidly fixed to one another, as described in greater detail below.

The cooling plate 30 is preferably made of a light weight metallic material, such as aluminum or aluminum alloys. The cooling plate 30 is also preferably made of a metallic material that readily conducts heat.

Figure 5:
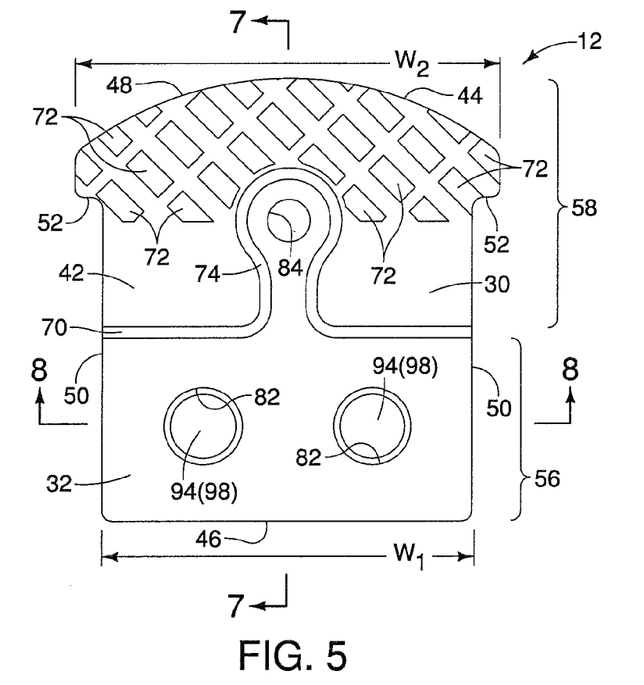
FIG. 5 is a rear elevational view of the brake pad removed from the caliper, showing a back plate, a cooling plate and rivet heads of a friction pad that rigidly fix the friction pad to the cooling plate, and also showing cooling fins of the cooling plate in accordance with the one embodiment.
Figure 6:
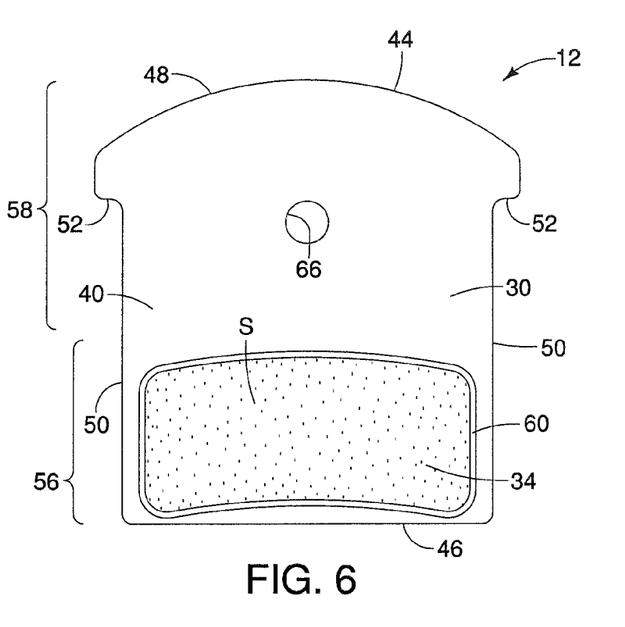
FIG. 6 is a front elevational view of the brake pad removed from the caliper, showing the cooling plate and the friction pad, and also showing the friction surface of the friction pad in accordance with the one embodiment.

As best shown in FIGS. 5 and 6, the cooling plate 30 has a first surface 40, a second surface 42 and a peripheral edge 44 that extends around an outer periphery of the cooling plate 30 between the first surface 40 and the second surface 42. The peripheral edge 44 includes a first edge section 46, a second edge section 48 opposite the first edge section 46 and side edge sections 50 that extend between the first and second edge sections 46 and 48. The first edge section 46 has a generally straight shape, as shown in FIGS. 5 and 6. The second edge section 48 has a curved shape, as is also shown in FIGS. 5 and 6. The curved shape of the second edge section 48 provides a greater overall surface area to the second edge section 48 compared to the first edge section 46.

Adjacent the first edge section 46, the cooling plate 30 has a width $W_1$ that is dimensioned such that only the end of the cooling plate 30 corresponding to the first edge section 46 can only be inserted into the bicycle calliper 22. Adjacent to the second edge section 48, the cooling plate 30 has a width $W_2$ that is dimensioned to prevent second edge section 48 from being inserted into the bicycle calliper 22. The width $W_2$ is greater than the width $W_1$. Further, each of the side edge sections 50 of peripheral edge 44 of the cooling plate 30 include a shoulder 52 that defines a transition between the width $W_1$ and the width $W_2$. The shoulders 52 also provide a positioning surface that contacts a portion of the bicycle calliper 22, limiting insertion movement of the cooling plate 30 and the brake pad 12 into the brake calliper 22. In other words, when the brake pad 12 is inserted into the bicycle calliper 22, the shoulders 52 are dimensioned to rest on surfaces of the brake calliper 22 and are thereby prevented from being inserted into the brake calliper 22.

Figure 12:
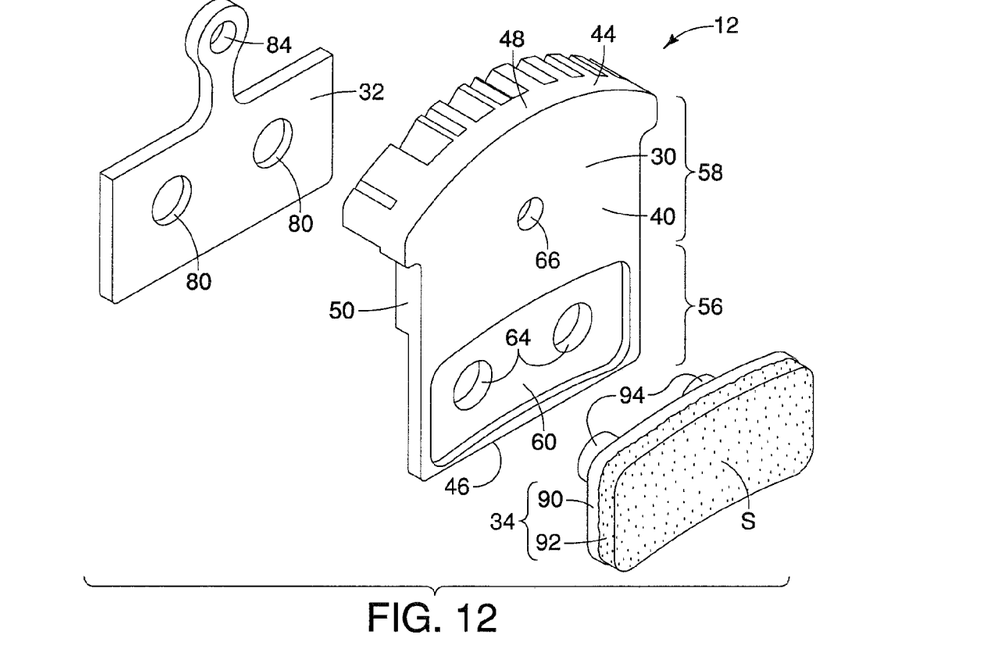
FIG. 12 is another exploded perspective view of the brake pad showing the cooling plate, the back plate and the friction pad separated from one another prior to final assembly and the formation of the rivet heads in accordance with the one embodiment.

As best shown in FIG. 12, the cooling plate 30 also includes a pad supporting section 56 adjacent to the first edge portion 46 of the peripheral edge 44 and a heat dissipation section 58 adjacent to the second edge portion 48 of the peripheral edge 44.

Figure 10:
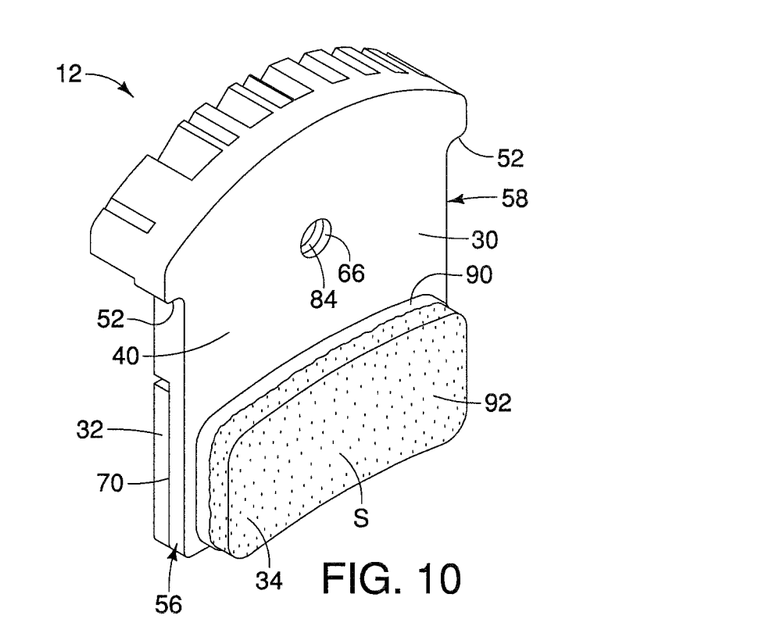
FIG. 10 is another perspective view of the brake pad showing the cooling plate, the back plate and the friction pad along with another view of the cooling fins of the cooling plate in accordance with the one embodiment.

As best shown in FIGS. 6, 10 and 12, the first surface 40 overall is a flat, planar surface that is interrupted by a recess 60 (best shown in FIG. 12). The recess 60 of the first surface 40 and portions of the first surface 40 adjacent to the recess 60 generally define the pad supporting section 56 of the cooling plate 30. Further, the recess 60 also defines a pad receiving area dimensioned to snugly receive the friction pad 34, described in greater detail below. The recess 60 further includes a pair of apertures 64, each of the apertures 64 extending between the first surface 40 (at the recess 60) and the second surface 42. The first surface 40 also includes a hole 66 that is used to retain the brake pad 12 to the bicycle calliper 22 in a conventional manner.

The portion of the first surface 40 of the cooling plate 30 extending between the recess 60 and the second edge section 48 generally defines one side of the heat dissipation section 58. Specifically, that portion of the first surface 40 extending between the recess 60 and the second edge section 48 can easily dissipate heat generating during braking.

Figure 9:
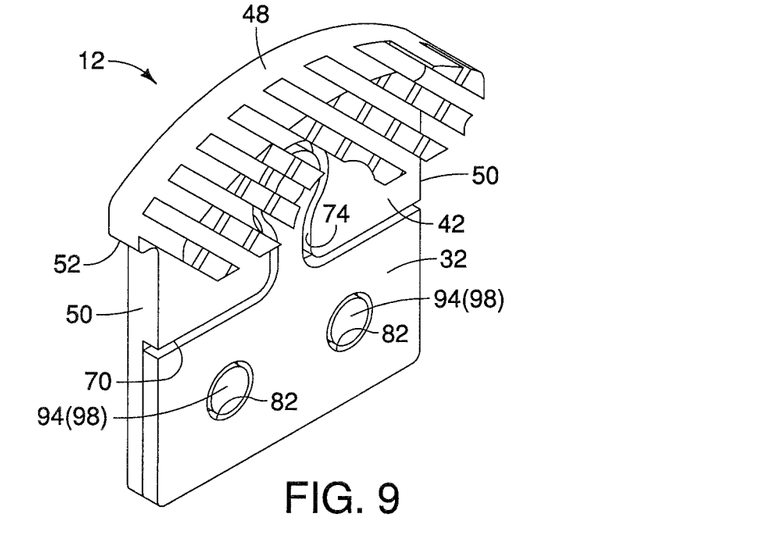
FIG. 9 is a perspective view of the brake pad showing the cooling plate, the back plate and the rivet heads along with the cooling fins of the cooling plate in accordance with the one embodiment.
Figure 11:
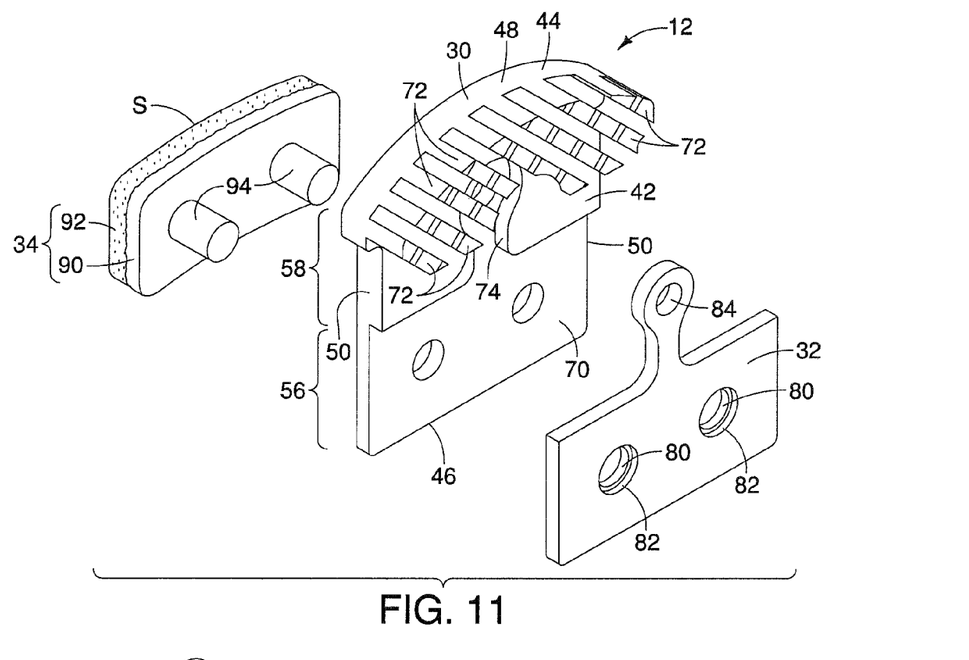
FIG. 11 is an exploded perspective view of the brake pad from the same perspective as FIG. 9, showing the cooling plate, the back plate and the friction pad separated from one another prior to final assembly and the formation of the rivet heads in accordance with the one embodiment.

As best shown in FIGS. 5, 9 and 11, the second surface 42 is, overall, a flat, planar surface that is interrupted by a recess 70 (best shown in FIGS. 5 and 11) and heat dissipating fins 72. The recess 70 of the second surface 42 has an overall rectangular shape with a contoured portion 74 that extends around the hole 66 such that the hole 66 is open to the recess 70 and hence is open to the second surface 42.

The rectangular shaped area of the recess 70 includes the pair of apertures 64. Further, the recess 70 is shaped to conform to the attachment plate 32, which is described in greater detail below. More specifically, the recess 70 is dimensioned such that the attachment plate 32 snugly fits into the recess 70.

Those portions of the second surface 42 other than the recess 70 generally define another side of the heat dissipation section 58. In particular the flat area of the second surface 42 adjacent to the heat dissipating fins 72 and the fins 72 generally define the heat dissipation section 58.

The heat dissipating fins 72 extend outward from the second surface 42 and are located adjacent to the second edge section 48. The cooling plate 30 and the heat dissipating fins 72 are unitarily formed as a single monolithic element with no seams or interruptions therebetween, in the depicted embodiment. However in an alternative embodiment, the heat dissipating fins 72 can be formed separately and then fixedly attached or otherwise welded to the second surface 42 of the cooling plate 30.

Further, the heat dissipating fins 72 extend outward from the second surface 42 in a direction perpendicular to the second surface 42. As is discussed in greater detail below, the friction pad 34 extends in a direction outward from the first surface 40. Further, the friction pad 34 extends in a direction perpendicular to the first surface 40. The heat dissipating fins 72 extend in a direction that is opposite the extending direction of the friction pad 34. The first surface 40 and the second surface 42 are parallel to one another in the depicted embodiment. Therefore, the heat dissipating fins 72 and the friction pad 34 extend in directions parallel to, but opposite from one another.

A description of the attachment plate 32 is now provided with specific reference to FIGS. 11 and 12. The attachment plate 32 is preferably made of stainless steel, but can alternatively be made of another metallic material. Preferably, the attachment plate 32 is made of a material that is harder and more rigid that the cooling plate 30. The attachment plate 32 (a back plate) is disposed on the second surface 42 within the recess 70. The attachment plate 32 is further disposed at the pad supporting section 56 of the cooling plate 30. The attachment plate 32 includes a pair of apertures 80 dimensioned such that, with the attachment plate 32 installed in the recess 70 of the cooling plate 30, the apertures 80 align with the apertures 64 of the cooling plate 30. The attachment plate 32 is also provided with recesses 82 that encircle the apertures 80. Further, the attachment plate 32 is provided with a hole 84 dimensioned such that, with the attachment plate 32 installed in the recess 70 of the cooling plate 30, the aperture 84 aligns with the hole 66 of the cooling plate 30.

Figure 7:
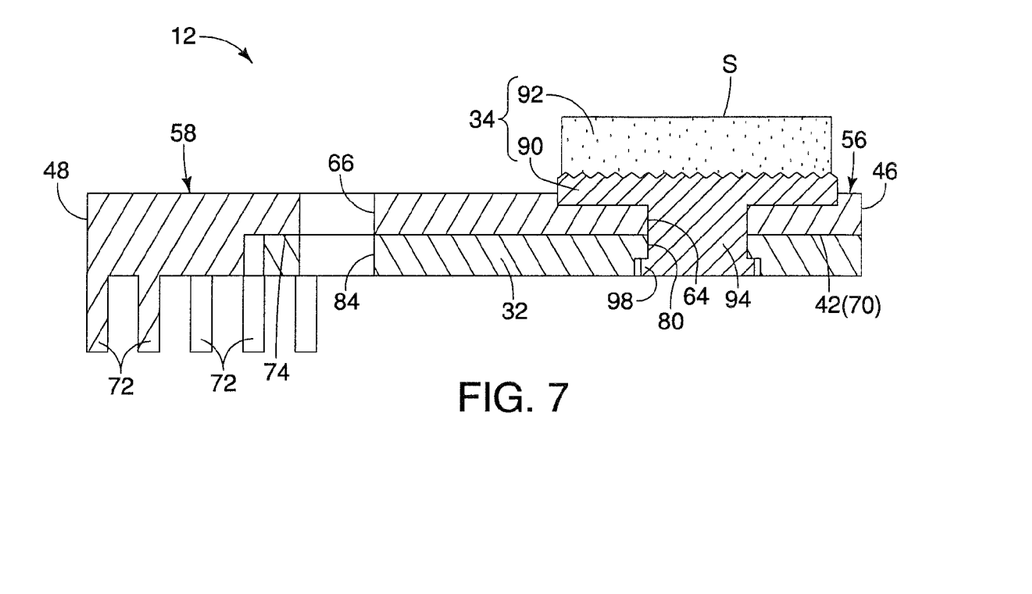
FIG. 7 is a cross-sectional view of the brake pad taken along the line 7-7 in FIG. 5, showing the cooling plate, the back plate and the friction pad rigidly fixed to one another by rivet portions of the friction pad, the rivet portions including the rivet heads in accordance with the one embodiment.
Figure 8:
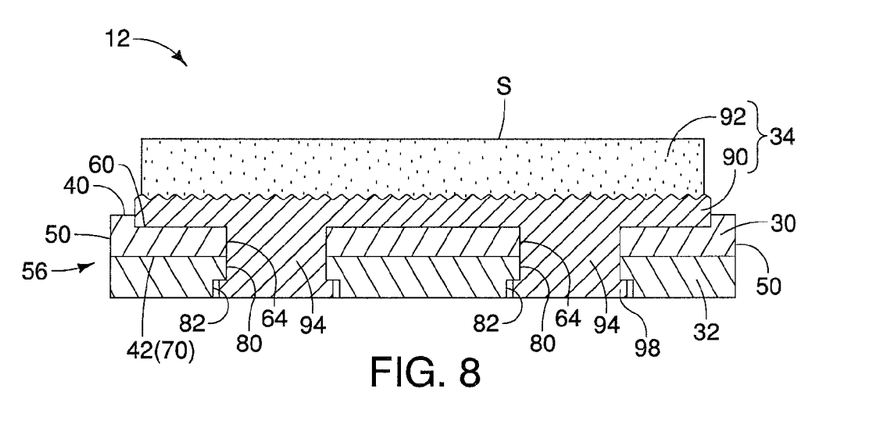
FIG. 8 is another cross-sectional view of the brake pad taken along the line 8-8 in FIG. 5, showing the cooling plate, the back plate and the friction pad rigidly fixed to one another by one of the rivet portions of the friction pad in accordance with the one embodiment.

As best shown in FIGS. 7 and 8, the friction pad 34 is fixedly and rigidly attached to both the cooling plate 30 and the attachment plate 32 (back plate). The friction pad 34 basically includes a base portion 90 (an attachment part) and a pad part 92. The pad part 92 includes a braking surface S that is dimensioned for contact with corresponding annular surfaces of the brake rotor 20. Specifically, when the braking surface S is pressed against the corresponding surface of the brake rotor 20, friction is generated that provides braking force.

The base portion 90 (the attachment part) is made of a metallic material, such as brass, aluminium, steel alloy or other metallic material that provide good heat transferring properties. The base portion 90 also provides rigid support for the pad part 91 and the braking surface S. The pad part 92 is made of a sintered material suitable for use as a braking material when pressed against the brake rotor 20.

The pad part 92 is formed using a conventional sintering process such that the pad part 92 is sintered to the base portion 90. More specifically, the pad part 92 is rigidly and fixedly connected to the base portion 90. Hence, the pad part 92 and the base portion 90 are formed as a single monolithic element. Although the drawings depict the pad part 92 and the base portion as being separate layers, they are manufactured as a unitary, single monolithic element. Hence, the friction pad 34 is made entirely of a non-elastic material.

The base portion 90 includes a pair of rivet portions 94 that extend outward from a back side of the base portion 90, opposite the braking surface S. The rivet portions 94 extend in directions parallel to one another. Preferably, the rivet portions 94 are cylindrically shaped, as depicted in FIG. 11.

The friction pad 34 is fixedly connected to the pad supporting section 56 of the cooling plate 30 such that the friction pad 34 fits into and covers recess 60 (the pad receiving area) of the first surface 40. During assembly of the friction pad 34, the rivet portions 94 are inserted through the apertures 64. The attachment plate 32 (back plate) can be placed into the recess 70 on the second surface 42 of the cooling plate 30, either before or after the friction pad 34 is assembled to the cooling plate 30. Consequently, the rivet portions 94 extend through the apertures 64 and the apertures 80 of the attachment plate 32. Thereafter, the rivet portions 94 are deformed to form the deformed heads 98. The heads 98 fill the recesses 82, rigidly fixing the friction pad 34 to the cooling plate 30 and the attachment plate 34 to one another, with the cooling plate 30 sandwiched between the attachment plate 32 and the friction pad 34. Consequently, the rivet portions fixedly connect the friction pad 34 to the pad supporting section 56 with the friction pad 34 covering the pad receiving area of the first surface 40 of the cooling plate 30. Contact between the friction pad 34, the rivet portion 94 and the pad supporting section 56 provide heat conduction between the friction pad 34 and the cooling plate 30.

Figure 2:
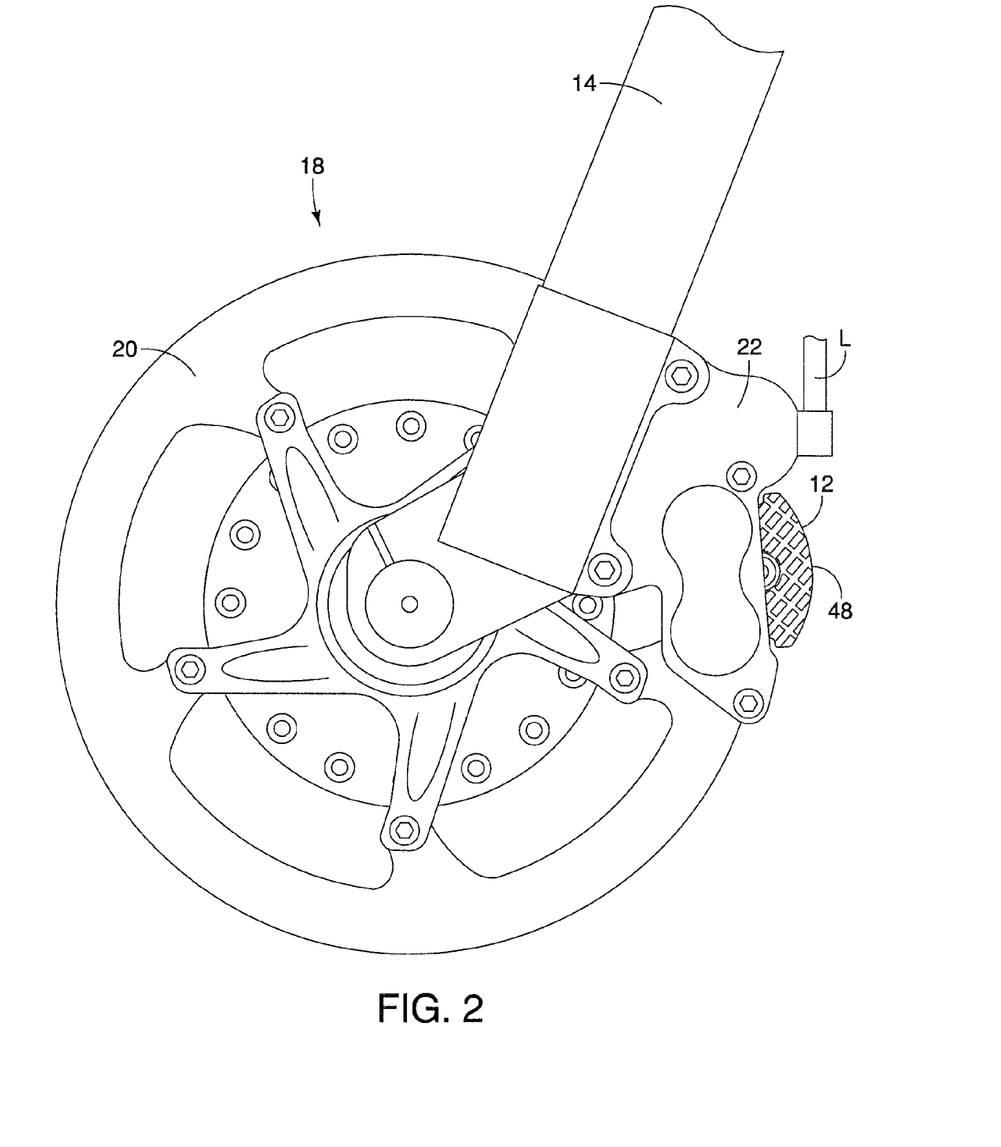
FIG. 2 is an enlarged side elevational view of a front brake assembly showing a rotor, a brake caliper and the brake pad in accordance with the one embodiment.

The brake pad 12 is installed to a brake pad receiving section of the brake caliper 22 such that the pad supporting section 56 (and the friction pad 34) are installed to the brake pad receiving section of the brake calliper and the heat dissipation section 58 extends outward and away from the brake calliper 22 and the rotor 20. Consequently, the majority of the heat dissipation section 58 extends out of the brake calliper 22, as indicated in FIG. 2. In particular, all of the heat dissipating fins 72 are disposed outside of the brake calliper 22 and can readily dissipate heat.

As best indicated in FIG. 6, the pad supporting section 56 measured relative to and along the first surface 40 has an overall first surface area. The heat dissipation section 58 measured relative to and along the first surface 40 has an overall second surface area that is greater than the first surface area. Further, the heat dissipation section 58 includes a portion of the first surface 40 (as indicated in FIG. 6), a portion of the second surface 42 (as indicated in FIG. 5) and the heat dissipating fins 72. Consequently, there are many surfaces making up the heat dissipation section 58. As a result, the brake pad 12 provides a significant amount of surface area for heat dissipation. The total surface area of the heat dissipation section 58 is greater than the surface area of the braking surface S of the friction pad 34 of the brake pad 12. Further, the total surface area of the heat dissipation section 58 is greater than twice the surface area of the braking surface S of the friction pad 34. Still further, the total surface area of the heat dissipation section 58 can be as much as three times greater than the surface area of the braking surface S of the friction pad 34.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the brake pad 12. Accordingly, these terms, as utilized to describe the brake pad 12 should be interpreted relative to a bicycle equipped with the brake pad 12 as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle brake pad comprising:
a cooling plate including a pad supporting section and a heat dissipation section, the pad supporting section having first and second surfaces facing in opposite directions;
an attachment plate mechanically and fixedly connected to the pad supporting section of the cooling plate on the first surface of the pad supporting section, the first surface of the pad supporting section including a recess with the attachment plate being at least partially disposed in the recess; and
a friction pad mechanically and fixedly connected to the pad supporting section of the cooling plate on the second surface of the pad supporting section, the friction pad including at least one mechanical fastener extending from the friction pad through the cooling plate and the attachment plate to fasten the friction pad to both the cooling plate and the attachment plate.

2. The bicycle brake pad according to claim 1, wherein the at least one mechanical fastener is a rivet.

3. The bicycle brake pad according to claim 1, wherein the cooling plate has at least one aperture through which the at least one mechanical fastener extends, such that the friction pad and the cooling plate are fixedly connected together.

4. The bicycle brake pad according to claim 3, wherein the friction pad includes a pad part and an attachment part, the attachment part including the at least one mechanical fastener.

5. The bicycle brake pad according to claim 4, wherein the pad part and the attachment part are formed integrally as a single monolithic element.

6. The bicycle brake pad according to claim 1, wherein the heat dissipation section includes a plurality of heat dissipating fins.

7. The bicycle brake pad according to claim 1, wherein the cooling plate has a hole spaced from the pad supporting section, and
the attachment plate has a hole which is aligned with the hole of the cooling plate with the attachment plate disposed in the recess of the cooling plate.

8. The bicycle brake pad according to claim 1, wherein the second surface of the pad supporting section includes a recess with the friction pad being at least partially disposed in the recess.

9. The bicycle brake pad according to claim 1, wherein the attachment plate has at least one aperture which receives the at least one mechanical fastener,
the attachment plate further having at least one recess that encircles the at least one aperture to receive a portion of the at least one mechanical fastener therein.

10. A bicycle brake assembly comprising:
a brake rotor;
a brake calliper having at least one piston and a brake pad receiving section, the brake calliper being operably supported adjacent to the brake rotor; and
a brake pad including:
    a cooling plate including a pad supporting section and a heat dissipation section, the pad supporting section having first and second surfaces facing in opposite directions;
    an attachment plate mechanically and fixedly connected to the pad supporting section of the cooling plate on the first surface of the pad supporting section, the first surface of the pad supporting section including a recess with the attachment plate being at least partially disposed in the recess; and
    a friction pad mechanically and fixedly connected to the pad supporting section of the cooling plate on the second surface of the pad supporting section, the friction pad including at least one mechanical fastener extending from the friction pad through the cooling plate and the attachment plate to fasten the friction pad to both the cooling plate and the attachment plate,
the pad supporting section being installed to the brake pad receiving section of the brake calliper and the heat dissipation section extending outward and away from the brake calliper and the rotor.

11. The bicycle brake assembly according to claim 10, wherein
the at least one mechanical fastener is a rivet.

12. The bicycle brake assembly according to claim 10, wherein
the cooling plate has at least one aperture through which the at least one mechanical fastener extends such that the friction pad and the cooling plate are fixedly connected together.

13. The bicycle brake assembly according to claim 12, wherein
the friction pad includes a pad part and an attachment part, the attachment part including the at least one mechanical fastener.

14. The bicycle brake assembly according to claim 13, wherein
the pad part and the attachment part are formed integrally as a single monolithic element.

15. The bicycle brake assembly according to claim 10, wherein
the heat dissipation section includes a plurality of heat dissipating fins.

16. The bicycle brake pad according to claim 10, wherein the cooling plate has a hole spaced from the pad supporting section, and
the attachment plate has a hole which is aligned with the hole of the cooling plate with the attachment plate disposed in the recess of the cooling plate.

17. The bicycle brake pad according to claim 10, wherein the second surface of the pad supporting section includes a recess with the friction pad being at least partially disposed in the recess.

18. The bicycle brake pad according to claim 10, wherein the attachment plate has at least one aperture which receives the at least one mechanical fastener,
the attachment plate further having at least one recess that encircles the at least one aperture to receive a portion of the at least one mechanical fastener therein.

\* \* \* \* \*